United States Patent Office 3,809,571
Patented May 7, 1974

3,809,571
PROCESS FOR MAKING SILICON METAL
Norman R. Berlat, Vienna, W. Va., assignor to Union
Carbide Corporation, New York, N.Y.
No Drawing. Filed Apr. 4, 1972, Ser. No. 241,085
Int. Cl. C23c 11/06
U.S. Cl. 117—106 A                5 Claims

ABSTRACT OF THE DISCLOSURE

There is described an improvement in making polycrystalline silicon metal, as used for the making of semiconductors, from trichlorosilane which involves providing greater amounts of trichlorosilane in a metal forming reactor then heretofore has been employed. This provides greater Si metal productivity than was heretofore believed possible.

---

The invention relates to the manufacture of polycrystalline silicon metal by the thermal reduction of trichlorosilane, and, more specifically, this invention involves an improvement in silicon metal production from the thermal reduction of trichlorosilane to achieve higher silicon metal productivity than heretofore thought possible.

Polycrystalline silicon metal is commercially produced by the thermal reduction of either trichlorosilane, silicon tetrachloride or silane. Practically all silicon metal commercially made is obtained by the thermal reduction of trichlorosilane ($HSiCl_3$) in a closed reactor in which there is suspended, out of contact with the reactor walls, a deposition rod (the term "rod" as used herein and in the claims includes and encompasses rods, wires, filaments, etc.) which is electrically heated, usually by direct current. The most common reactor has an ordinary bell jar design, comprising a metal base plate from which the rod is extended upwardly, inlets and outlets therein for gases, and a quartz bell jar cover over the plate. Electrical connections are provided in the reactor for heating the rods.

The rod is brought to reaction temperature, usually from about 1000° C. to about 1200° C., and then $HSiCl_3$ mixed with hydrogen gas is fed to the reactor. Most of the heat is about the rod surface and therefore, silicon metal production occurs on the rod surface. It is important, as in most chemical reactions, to avoid reactions on the reactor wall(s) and, hence, the wall(s) is kept at a temperature sufficiently low to preclude such reactions thereat, particularly of the kind which produces a silicon metal coating on the wall(s).

The trichlorosilane fed to the reactor with $H_2$ gas is mixed with the $H_2$, in the usual case, by bubbling $H_2$ through or passing $H_2$ over a liquid or vaporous body of $HSiCl_3$. The temperature of the $HSiCl_3$ and the temperature of the gas mixture, determines the partial pressure of $HSiCl_3$ and, therefore, the mole percent of $HSiCl_3$ in the mixture. In the usual case, not much more than 5 mole percent $HSiCl_3$ is provided in the mixture, the remainder being hydrogen.

The flow rates, mole ratios and reaction conditions are established at the beginning of the reaction, and the production run is typically carried out without significant variation.

The nature of the reduction of $HSiCl_3$ has been chemically examined, and certain factors from such examination have led to the discovery that silicon metal production can be, from a productivity standpoint, greatly enhanced, indeed, can be at least doubled, and even increased to a rate at least five times greater. The following are now appreciated to be determinants to Si metal production. (A) The deposition of silicon metal from trichlorosilane has been determined to occur within 0.3 second at 1000° C. probably by 0.1 second. This means that the decomposition of $HSiCl_3$ occurs faster. (B) It is now established that $HSiCl_3$ disproportionates in space at such deposition temperatures with HCl and $SiCl_4$ to form a silicon compound mixture containing less hydrogen per Si than $HSiCl_3$ and the nature of the disproportionated products are dependent upon the proportion of HCl to $SiCl_4$ to $HSiCl_3$. (C) It is known that reduced silanes convert to Si metal faster than fully oxidized silanes such as $SiCl_4$, viz, compare $H_4Si$, $H_3SiCl$, $H_2SiCl_2$, $HSCl_3$ and $SiCl_4$. (D) It is logical to assume that in a silicon metal reactor, the concentration of $SiCl_4$ is greater at about the rod surface where it is formed and, therefore, the H to Si ratio at about the rod surface is lower than at any other portion of the reactor. (E) Also it has been determined that the temperature gradient from the hot rod to the much cooler reactor wall drops significantly at about a few centimeters from the rod to a temperature below the effective decomposition temperature of $HSiCl_3$.

It therefore follows:

(1) Most, if not essentially all of the reactions, spacial and/or surface, occur about the rod surface;

(2) The concentration of $HSiCl_3$ at about the rod surface to provide a high H/Si ratio is most important to the effectiveness of the process.

It is now known that the rate of silicon metal growth in the known $HSiCl_3$ silicon metal processes can be at least doubled, and in some cases can be increased by 500 percent or more, by the simple expedient of insuring that enough $HSiCl_3$ is present in the reactor to achieve and maintain that growth rate. The use of such large amounts of trichlorosilane in the reactor coupled to the consequent rate of the increase in rod surface area is novel. It is believed that the increased amount of $HSiCl_3$ in the reactor achieves a H to Si ratio at about the rod surface(s) more favorable to silicon metal production.

There is described herein an improved process by which it can now be shown that the prior art and prior commercial practices relating to the manufacture of Si metal from $HSiCl_3$ describe or operate "starved" reactions, i.e., employ less $HSiCl_3$ than is described herein in the same apparatus and with the same process steps.

The process of this invention involves using the prior art techniques of making Si metal from $HSiCl_3$-$H_2$ gas mixtures characterized by the improvement which is to maintain in the reactor greater amounts of trichlorosilane during the continuous run of the reaction than has heretofore been employed, preferable an amount of trichlorosilane in accord with the following equation:

$$A = \frac{4.8237 GR}{C}$$

wherein "A" is defined as grams per hour of $HSiCl_3$ maintained in the reactor (gm./hr.); "G" is the growth of the rod during the process in grams per hour per square centimeter (g./hr./cm.$^2$) and desirably exceeds about 0.125 g./hr./cm.$^2$ and usually does not exceed about 0.5 g./hr./cm.$^2$, preferably at least about 0.2 g./hr./cm.$^2$ to about 0.4 g./hr./cm.$^2$. "R" is the surface area of each rod in the reactor and is the sum of the surface areas of each rod in the reactor measured in square centimeters (cm.$^2$); and "C" is the fraction conversion of $HSiCl_3$ to silicon metal. The constant 4.8237 is the molecular weight of $HSiCl_3$ (135.5) divided by the atomic weight of silicon (28.09).

The amount of $HSiCl_3$ desirable in the reactor pursuant to the above equation is not dependent upon a concentration factor. However, concentration of $HSiCl_3$ in the feed to the reactor, i.e., the $HSiCl_3$-$H_2$ gas mixture, can be employed as a means to provide the desired amount of $HSiCl_3$ in the reactor. The second method for controlling the HSiCl₃ content in the reactor is by increasing or decreasing the feed rate of HSiCl₃-H₂ mixture to the reactor. A combination of concentration and feed rate represents the third way of controlling or providing the proper amount of HSiCl₃ in the reactor.

Because the amount of HSiCl₃ present in the reactor, according to this invention, is greater than heretofore thought feasible, limiting the concentration of HSiCl₃ in the gas feed to the accepted maximum of about 5 mole percent is no longer valid. Hence, the skilled worker can now employ, according to this invention, much greater concentrations of HSiCl₃, as much as 25 mole percent of the gas mixture feed. But since high concentration is not a critical factor to achieving the requisite amount of HSiCl₃ in the reactor, concentrations of about 2 mole percent, or lower, of HSiCl₃ in the feed may be employed.

In the most desirable embodiment of this invention, the amount of HSiCl₃ provided in the reactor exceeds 4 mole percent of the gases in the reactor, and preferably exceeds 5 mole percent of the gases in the reactor. Since the invention includes introducing trichlorosilane from recycle gases, small amounts of by-products produced in the reactor and not thereafter removed in a normal processing and separation, such as dichlorosilane, monochlorosilane, and silane may be present.

In a desirable embodiment, trichlorosilane is positively fed into admixture with hydrogen so as to insure direct control over the amount of trichlorosilane which is present in the feed gas mixture. The temperature of the reaction is essentially that which is defined above and which is practiced by the art.

The rate of growth of the rods during the reaction can be easily determined by noting the increase in the diameter of the rod during the decomposition reaction. Since the length of rod is fixed, the diameter increase will directly yield information as to the growth rate on a gram per square centimeter basis. They will provide instant information for calculating the area growth rate as specified by the equation above.

In practicing the process of this invention one must give concern with growth of reduced trichlorosilane upon the interior of the reactor wall, particularly silicon metal decomposition on the reactor wall. This is a problem particularly when the size of the rod increases so much as to increase the temperature at the wall of the reactor by virtue of the close proximity of the rod surface to the reactor wall. The wall reactor temperature can be reduced by increasing the velocity of the gas introduced to the interior of the reactor. If this technique is employed to reduce the wall temperature, care should be taken that the amount of trichlorosilane introduced into the reactor at that point and time does not end up wasting trichlorosilane by reducing the conversion rate (C) to an unacceptable level. In such cases, the concentration of trichlorosilane in the hydrogen feed mixture should be reduced.

In the tables which follow, the reactions depicted therein were carried out in a conventional bell jar-type polycrystalline silicon reactor of the following description:

An opaque quartz bell jar cover having an inside diameter of 17 inches, a wall thickness of ¾ of an inch, and a height of 40 inches to the top of the hemisphere dome thereof. The bell jar cover contains a rectangular glass port having the dimensions of 2 inches by 12 inches located near the open end thereof for the purpose of observing the reaction. The bell jar is placed upon a base plate constructed of carbon steel with a nickel and iridium coating. The base plate is water cooled in the conventional manner to prevent warpage during the reaction. The base plate also contains two water cooled silver electrodes connected to a power supply which provides the high voltage-low amperage starting current for silicon rods suspended on the base plate and within the bell jar cover. The base plate contains an inlet nozzle at its center having a ½ inch outside diameter and a ⅜ inch inside diameter which protrudes 3 inches above the base plate into the interior area of the bell jar cover. At one side of the base plate is an outlet nozzle having a 2-inch inside diameter. Each silicon rod suspended in the reactor is held in spectroscopic grade carbon sockets which are directly connected to the silver electrodes. These sockets are called "chucks." A spectroscopic grade carbon rod is fitted across the ends of every two rods to thereby interconnect them to complete passage of the current through the upstanding rods. The bell jar cover sits upon a seal located about the periphery of the base plate to prevent leakage of gas from the interior of the reactor. The outside of the reactor contains a metal shield as a protective shroud.

All hydrogen which is fed to the reactor is controlled by rotometers. Trichlorosilane used in the experiments is vaporized from a jacketed vessel which is heated by hot water passed through the jacket and the amount of trichlorosilane vapor fed is controlled by a rotometer. The trichlorosilane and hydrogen gases are mixed prior to entering the reactor through the inlet nozzle. The components introduced through the inlet nozzle and removed from the outlet nozzle are analyzed in a vapor phase chromatograph. Before introduction of the hydrogen-trichlorosilane mixture, to the reactor, it is sparged with nitrogen gas for 15 minutes to remove any oxygen present therein and thereafter sparged with hydrogen gas for 15 minutes, then the HSiCl₃ is added to the hydrogen gas and both are fed to the reactor as specified in the tables below. The power is fed to the rods and once the rods are brought to the desired temperature the power input is controlled manually. The rod temperature is measured with an optical pyrometer during the duration of each run. The quantity of trichlorosilane provided within the reactor is usually increased as the surface area of the rods increases. This insures maximum growth of metal.

Table I gives the growth rates and percent yields at 236, 472, 708 and 944 liters per minute. As expected, the growth rates increased with higher mole ratios and the percent yield decreased with increased mole ratio.

The surface quality dramatically improved with mole ratio. At two mole percent, the surface of the silicon was rough and cobby throughout. As the mole ratio was increased, the crystalline structure became more uniform and smooth.

In each experiment indicated in Table I, the total length of the run was six hours. The reactor in each run contained two upstanding rods and the rod temperature was 1150° C.

TABLE I

Effect of mole ratio trichlorosilane upon silicon growth rate

| Experiment number | H₂ flow, l./min. | HSiCl₃, kg./hr. | HSiCl₃, l./min. | Mole ratio | Silicon, grams | Rod diameter, cm. | Percent yield | Gms./hr. | Average growth rate Micron/min. | Gms./hr./cm.² |
|---|---|---|---|---|---|---|---|---|---|---|
| 1 | 236 | 4.09 | 10.9 | 4.6 | 526 | 1.245 | 10.6 | 88 | 14.5 | 0.224 |
| 2 | 236 | 5.685 | 15.1 | 6.0 | 646 | 1.397 | 9.1 | 108 | 16.6 | 0.242 |
| 3 | 236 | 9.08 | 25.5 | 9.7 | 792 | 1.499 | 7.0 | 132 | 18.0 | 0.280 |
| 4 | 472 | 3.6 | 10.4 | 2.1 | 554 | 1.270 | 11.8 | 92 | 14.8 | 0.230 |
| 5 | 472 | 9.08 | 25.7 | 5.2 | 842 | 1.588 | 7.3 | 140 | 19.2 | 0.281 |
| 6 | 472 | 12.7 | 35.2 | 6.9 | 1,000 | 1.676 | 6.9 | 166 | 20.5 | 0.314 |
| 7 | 472 | 18.16 | 50.3 | 9.6 | 1,020 | 1.689 | 5.2 | 169 | 20.6 | 0.320 |
| 8 | 708 | 5.45 | 15.1 | 2.0 | 574 | 1.422 | 8.25 | 96 | 16.9 | 0.209 |
| 9 | 708 | 11.35 | 30.2 | 4.0 | 970 | 1.681 | 7.35 | 162 | 20.5 | 0.300 |
| 10 | 708 | 16.34 | 45.3 | 6.0 | 1,120 | 1.821 | 6.02 | 195 | 22.5 | 0.341 |
| 11 | 944 | 18.16 | 50.5 | 5.0 | 1,368 | 1.976 | 6.09 | 237 | 25.6 | 0.381 |
| 12 | 944 | 45.4 | 106.7 | 11.7 | 1,366 | 1.948 | 2.9 | 273 | 29.5 | 0.446 |

Table II shows the results when the hydrogen gas rate was increased from 236 1/min. to 944 1/min. at a constant rod temperature, 1150° C., and a constant five mole percent trichlorosilane in the feed. The weight of silicon increased from 526 grams to 1368 grams with rod diameters of 1.245 cm. and 1.976 cm. at 236 1/min. and 944 1/min., respectively. The percent silicon yield decreased from 10.6 to about 6.0. The surface quality deteriorated only slightly with increased $H_2$ flow at the same rod temperature and mole ratio. This illustrates that the amount of trichlorosilane in the reactor vapor space is very important.

The rod diameter increased from 1.427 cm. to 3.411 cm. and the absolute growth rate increased from 168 grams/hour to 309 grams/hour. By taking the incremental weights for the incremental time, the incremental growth rates were obtained. The absolute growth rate was 472 grams/hour at the end while the unit growth rate leveled off at 0.23–0.25 grams/hour/cm.² The rods were leaning very badly and in several runs actually touched the reactor wall. However, when the silicon rod continues to grow at 20 microns/minute it is possible to grow two four-inch rods in 48 hours—heretofore, an unheard of production rate.

TABLE II
Effect of $H_2$ gas flow upon silicon growth rate

| Experiment number | $H_2$ flow, l./min. | $HSiCl_3$ flow, l./min. | Percent mole | Rod temperature, °C. | Weight silicon, gms. | Rod diameter, cm. | Percent yield | Average growth rate | | |
|---|---|---|---|---|---|---|---|---|---|---|
| | | | | | | | | Gms./hr. | Micron/min. | Gms./hr./cm.² |
| 1 | 236 | 11.8 | 4.9 | 1,150 | 526 | 1.245 | 10.6 | 88 | 14.5 | 0.224 |
| 5 | 472 | 25.5 | 5.2 | 1,150 | 842 | 1.588 | 7.3 | 140 | 19.2 | 0.281 |
| 10 | 708 | 45.3 | 6.0 | 1,150 | 1,120 | 1.821 | 6.0 | 195 | 22.5 | 0.341 |
| 11 | 944 | 50.0 | 5.0 | 1,150 | 1,368 | 1.976 | 6.0 | 238 | 25.6 | 0.381 |
| 4 | 472 | 10.4 | 2.0 | 1,150 | 554 | 1.270 | 11.8 | 92 | 14.8 | 0.230 |
| 8 | 708 | 15.1 | 2.0 | 1,150 | 574 | 1.422 | 8.2 | 96 | 16.9 | 0.209 |

One would expect that the higher gas flows would sufficiently lower the residence time to reduce the reaction. Although the yield decreases by two, the absolute quantity of silicon fed to the reactor increases by four; a net increase in growth rate. The high gas velocities increased the turbulence and the heat transfer characteristics of the system. The effluent gas temperatures at the end of the run were 245° C. and 350° C. for the 236 liters/minute and 944 liters/minute, respectively.

In Table III, four rods were grown to compare to two rods. As expected, the doubling of the silicon surface area had an appreciable effect.

In order to maintain straight silicon rods the initial rod temperature was held at 1100° C. and the hydrogen flow at 472 liters/minute until the rod diameter was large enough to prevent vibration. Then the rod temperature was increased to 1150° C. The run was terminated after 36 hours due to electrical problems. The rod diameter was 6.985 cm. and the absolute growth rate was 472 grams/hour.

The operating conditions were varied throughout the run to maximize growth rate. The limiting factor was a "fog" which develops on the reactor walls.

TABLE III

| Experiment number | $H_2$ flow l./min. | $HSiCl_3$ flow, l./min. | Percent mole | Rod temperature, °C. | Weight silicon, gms. | Silicon yield | Rod diameter, cm. | Silicon, gms./hr. |
|---|---|---|---|---|---|---|---|---|
| 13 [1] | 207 | 14.2 | 5.7 | 1,100 | 693 | 10.9 | 1.054 | 115 |
| 14 [2] | 236 | 14.2 | 5.7 | 1,100 | 360 | 5.6 | 1.041 | 60 |

[1] 4 rods.  [2] 2 rods.

The quantity of silicon obtained was practically doubled while the rod sizes were identical. The silicon yield also doubled. The silicon surface on the four rods showed some initial cobbiness at the base but the remainder was smooth. The surface of the two rod setup was smooth throughout.

A twelve-hour experiment was run under the following conditions:

$H_2$ flow: 708 liters/minute
Rod temperature: 1150° C.
$HSiCl_3$: 18.16–22 kg./hour Table IV shows five experiments attempting to deposit silicon for twelve hours. At the high gas flows and rod temperature the silicon rods vibrated. Three runs were terminated prematurely, before the end of twelve hours, when the rods broke.

When "fog" (either silicon metal or polysilanes) appeared on the reactor walls, the flow rate of $HSiCl_3$ was reduced. Within 30–60 minutes, the reactor wall haze disappeared. If the $HSiCl_3$ flow was increased to the original value, "fog" would reappear. Therefore, when the $HSiCl_3$ flow was increased the rod temperature was lowered in 25° C. increments. If "fog" developed, the hydrogen flow was increased in 250 feet³/hour increments. At the time of shutdown the rod temperature was 1100° C. and the hydrogen flow was 708 liters/min.

Table V shows the trichlorosilane requirements to grow two four-inch rods within 48 hours. As the surface area increases more trichlorosilane must be fed to the reactor to prevent starvation.

The limiting factor will be the deposition of silicon and polysilane on the reactor wall. If the maximum trichlorosilane was 15.85 kg./hour, the silicon growth rate TABLE IV
Extended runs with trichlorosilane*

| Experiment number | Run time, hours | Silicon, wt.-gms. | Rod diameter, cm. | Percent yield | Average growth rate | | | Weight, gms. | Time, hrs. | Gms./hr. | Gms./hr./cm.² |
|---|---|---|---|---|---|---|---|---|---|---|---|
| | | | | | Silicon, gms./hr. | Micron/min. | Gms./hr./cm.² | | | | |
| 9 | 4 | 674 | 1.427 | 4.0 | 168 | 25 | 0.374 | | | | |
| 6 | 6.5 | 1,300 | 1.821 | 4.6 | 193 | 20.7 | 0.313 | 623 | 2.5 | 249 | 0.243 |
| 15 | 8¾ | 2,010 | 2.515 | 4.6 | 229 | 22 | 0.322 | 710 | 2.25 | 315 | 0.230 |
| 16 | 13 | 4,020 | 3.411 | 4.6 | 309 | 20.5 | 0.288 | 2,010 | 5.25 | 472 | 0.253 |
| 17 | 36 | 17,025 | 6.985 | 9.8 | 472 | 15.7 | 0.215 | 13,005 | 23 | 565 | 0.172 |

*Conditions: 2 rods; $H_2$ flow, 708 liters/minute; Rod temperature, 1,150° C.; $HSiCl_3$, 18.1–22.7 kg./hr., 50–62.6 l./min.; Mole ratio, 6.6–8.1.

would plateau at 800 grams/hour after the rods reached two inches in diameter. The rods would then grow starved.

TABLE V

HSiCl₃ requirement versus rod diameter (2 rods)

| Diameter, cm. | Surface area, cm.² | Assume growth rate, 0.25 gms./hr./cm.² | Assume maximum conversion HSiCl₃ to silicon 25% | Trichlorosilane required, kg./hr. |
|---|---|---|---|---|
| 2.54 | 1,600 | 400 | 1,600 | 8.0 |
| 5.08 | 3,200 | 800 | 3,200 | 16.0 |
| 7.62 | 4,800 | 1,200 | 4,800 | 24.0 |
| 10.16 | 6,400 | 1,600 | 6,400 | 32.0 |

The following table is a compilation of experimental runs showing a variety of experimental conditions and the results thereof. Some of the experiments were previously cited.

tained in the reactor (gm./hr.); "G" is the growth of the rod during the process in grams per hour per square centimeter and from about 0.125 g./hr./cm.² to about 0.5 g./hr./cm.²; "R" is the sum of the surface areas of each rod in the reactor measured in square centimeters (cm.²); and "C" is the fraction conversion of HSiCl₃ to silicon metal.

2. The improved process of claim 1 wherein "G" is at least about .2 g./hr./cm.² and not greater than about .4 g./hr./cm.².

3. The process of claim 1 wherein there are two rods in the reactor.

4. The process of claim 1 wherein there are four rods in the reactor.

5. The process of claim 1 wherein gases from the reaction are recycled to the reactor.

TABLE VI

| Experiment Number | Number of rods | Length of run, hrs. | Rod temperature, °C. | H₂ flow, l/min. | HSiCl₃ flow, l/min. | HSiCl₃ flow, kg./hr. | Mole ratio | Weight silicon, gms. | Percent conversion | Rod diameter cm. | Average growth rate Gms./hr. | Average growth rate Micron/min. | Average growth rate Gms./hr./cm.³ |
|---|---|---|---|---|---|---|---|---|---|---|---|---|---|
| 1⁸ | 2 | 6 | 1,100 | 352 | 12.3 | 4.4 | 3.4 | 380 | 6.9 | 1.080 | 63 | 12.2 | 0.175 |
| 2⁹ | 2 | 3¾ | 1,100 | 405 | 15.1 | 5.4 | 3.6 | 411 | 9.7 | 1.181 | 68 | 34.7 | 0.277 |
| 2⁰ | 2 | 6 | 1,100 | 200 | 15.6 | 5.7 | 7.4 | 420 | 6.0 | 1.080 | 70 | 12 | 0.138 |
| 1¹ | 2 | 6 | 1,100 | 70 | 17.9 | 6.4 | 20.6 | 435 | 5.4 | 1.105 | 72 | 12.3 | 0.196 |
| 2³ | 4 | 6 | 1,100 | 207 | 14.2 | 5.0 | 6.4 | 693 | 10.9 | 1.054 | 115 | 11.8 | 0.172 |
| 2² | 4 | 6 | 1,100 | 202 | 13.2 | 4.5 | 6.1 | 556 | 10.4 | 0.914 | 93 | 9.9 | 0.153 |
| 1³ | 2 | 6 | 1,100 | 250 | 6.5 | 2.8 | 2.6 | 312 | 10.7 | 0.965 | 52 | 10.6 | 0.134 |
| 2⁴ | 2 | 6 | 1,100 | 236 | 14.2 | 5.0 | 5.7 | 360 | 5.6 | 1.041 | 60 | 11.8 | 0.172 |
| 2 | 2 | 6 | 1,150 | 236 | 15.1 | 5.7 | 6.0 | 646 | 9.1 | 1.397 | 108 | 16.6 | 0.242 |
| 2⁴ | 2 | 4.5 | 1,200 | 236 | 17.0 | 5.9 | 6.7 | 542 | 9.8 | 1.257 | | 19.5 | 0.283 |
| 2⁵ | 2 | 6 | 1,200 | 85 | 23.4 | 13.1 | 21.7 | 822 | 7.8 | 1.613 | | 19.5 | 0.270 |
| 3⁶ | 2 | 4.5 | 1,200 | 221 | 21.7 | 7.7 | 9.0 | 560 | 7.7 | 1.295 | | 30.2 | 0.304 |
| 1 | 2 | 6 | 1,150 | 236 | 25.8 | 9.1 | 9.7 | 792 | 7.0 | 1.499 | 132 | 18 | 0.280 |
| 2 | 2 | 6 | 1,150 | 236 | 10.9 | 4.1 | 4.6 | 526 | 10.6 | 1.245 | 88 | 14.5 | 0.224 |
| 5⁷ | 2 | 6 | 1,100 | 472 | 21.9 | 7.9 | 4.4 | 602 | 6.3 | 1.308 | 101 | 15.4 | 0.243 |
| 6 | 2 | 6 | 1,150 | 472 | 25.7 | 9.4 | 5.0 | 842 | 7.3 | 1.588 | 140 | 19.2 | 0.281 |
| 7 | 2 | 6 | 1,150 | 472 | 35.2 | 12.7 | 6.9 | 1,000 | 6.9 | 1.676 | 166 | 20.5 | 0.314 |
| 4 | 2 | 6 | 1,150 | 472 | 50.5 | 18.1 | 9.6 | 1,020 | 5.2 | 1.689 | 169 | 20.6 | 0.320 |
| 2 | 2 | 6 | 1,150 | 472 | 10.3 | 3.6 | 2.1 | 554 | 11.8 | 1.270 | 92 | 14.8 | 0.230 |
| 2⁸ | 2 | 2 | 1,150 | 708 | 17.5 | 6.4 | 2.4 | 158 | 6.0 | 0.701 | 70.2 | 28.4 | 0.319 |
| 8⁹ | 2 | Aborted | | | | | | Aborted | | | | | |
| 9 | 2 | 6 | 1,150 | 708 | 15.1 | 5.4 | 2.0 | 574 | 8.25 | 1.422 | 96 | 16.9 | 0.209 |
| 1 | 2 | 6 | 1,150 | 708 | 30.2 | 11.4 | 4.0 | 970 | 7.35 | 1.681 | 162 | 20.5 | 0.300 |
| 3⁰ | 2 | 6 | 1,150 | 708 | 45.3 | 16.3 | 6.0 | 1,120 | 6.02 | 1.821 | 195 | 22.5 | 0.341 |
| 3⁰ | 2 | 6 | 1,200 | 472 | 22.6 | 8.2 | 4.6 | 940 | 8.90 | 1.694 | 157 | 20.7 | 0.295 |
| 3¹ | 2 | 6 | 1,050 | 472 | 22.6 | 8.2 | 4.6 | 300 | 2.95 | 0.940 | 50 | 10.2 | 0.169 |
| 1² | 2 | 6 | 1,150 | 472 | 43.9 | 15.9 | 8.6 | 1,060 | 5.37 | 1.727 | 177 | 20.4 | 0.325 |
| 1² | 2 | 5 | 1,130 | 944 | 125.6 | 45.4 | 11.7 | 1,366 | 2.9 | 1.948 | 273 | | 0.446 |
| 1² | 2 | 5¾ | 1,150 | 944 | 50.0 | 18.1 | 5.0 | 1,368 | 6.0 | 1.976 | 238 | 25.6 | 0.381 |
| 3¹ | 2 | 3¼ | 1,175 | 708 | 50.5 | 18.1 | 5.0 | 516 | 5.6 | 1.209 | 159 | 25.8 | 0.417 |
| 3³ | 2 | 6.5 | 1,150 | 708 | 64.1 | 22.7 | 8.3 | 1,300 | 4.6 | 1.821 | 193 | 20.7 | 0.313 |
| 1⁴ | 2 | 8¾ | 1,150 | 708 | 65.3 | 22.7 | 8.4 | 2,010 | 4.6 | 2.515 | 229 | 22 | 0.322 |
| 3⁵ | 2 | 4 | 1,150 | 708 | 56.6 | 20.4 | 7.4 | 674 | 4.0 | 1.428 | 168 | 25 | 0.374 |
| 1⁵ | 2 | 13 | 1,150 | 708 | 68.9 | 25.0 | 8.9 | 4,020 | 4.6 | 3.411 | 309 | 20 | 0.309 |
| 3⁶ | 2 | 13 | 1,150 | 472 | 70.8 | 25.0 | 13.3 | 3,696 | 5.26 | 3.218 | 284 | 19.3 | 0.280 |
| 3⁶ | 2 | 5 | 1,125 | 708 | Varied | | | 418 | 3.84 | 1.122 | 83 | 15.3 | 0.236 |
| 3⁷ | 2 | 16 | 1,150 | 708 | Varied | | | 4,600 | 6.57 | 3.658 | 288 | 18 | 0.250 |
| 1⁸ | 2 | 36 | Conditions varied throughout run | | | | | 17,025 | 9.76 | 6.934 | 472 | 15.8 | 0.216 |
| 3⁷ | 2 | 16 | Conditions varied | | | | | 3,005 | 7.26 | 2.946 | 188 | 14.2 | 0.203 |
| 4⁰ | 2 | 8 | 1,100 | 377 | | | | 1,021 | 4.1 | 1.706 | 127 | 15.6 | 0.237 |
| 41 | 2 | 4 | 1,075 | 472 | 23.6 | | 4.8 | 262 | 3.7 | 0.889 | 66 | 14.3 | 0.234 |

What is claimed is:

1. In the process of continuously making polycrystalline silicon metal on a rod deposition surface in a reaction by the continuous thermal reduction at a temperature of about 1000° C. to about 1200° C. of HSiCl₃ in admixture with hydrogen, wherein the improvement comprises maintaining an amount of trichlorosilane in said reactor which satisfies the equation:

$$A = \frac{4.8237 GR}{C}$$

wherein "A" is defined as grams per hour of HSiCl₃ main-

References Cited

UNITED STATES PATENTS

| 3,748,169 | 7/1973 | Keller | 117—106 A |
| 3,523,816 | 8/1970 | Cave | 117—106 |
| 3,679,470 | 7/1972 | Rogers et al. | 117—106 |
| 3,635,683 | 1/1972 | Harrison et al. | 117—106 |

ALFRED L. LEAVITT, Primary Examiner

J. MASSIE, Assistant Examiner

U.S. Cl. X.R.

117—135.1

UNITED STATES PATENT OFFICE
CERTIFICATE OF CORRECTION

Patent No. 3,809,571                Dated May 7, 1974

Inventor(s) Norman R. Berlat

It is certified that error appears in the above-identified patent and that said Letters Patent are hereby corrected as shown below:

Column 1, line 14, "then" should read -- than --.
Column 4, line 53, "ratios" should read -- percent --.
Column 4, line 54, "ratio" should read -- percent --.
Table I, line 65, "ratio" should read -- percent --.
Table I, line 68, "ratio" should read -- percent --.
Column 5, line 9, "ratio" should read -- percent --.
Table IV, last line, "ratio" should read -- percent --.
Table VI, column 8, "ratio" should read -- percent --.
Table VI, column 1, after "Experiment Number" delete -- 1 --.
Table VI, column 6, first line of numbers, "123" should read -- 12.3 --.
Table VI, column 1, "29" should read -- 19 --.
"11" should read -- 21 --.
"23" should read -- 12 --.
"13" should read -- 23 --.
"24" should read -- 14 --.
"36" should read -- 26 --.
" 1" should read --  3 --.
" 2" should read --  1 --.
"57" should read -- 27 --.
" 6" should read --  5 --.
" 7" should read --  6 --.
" 4" should read --  7 --.
" 2" should read --  4 --.
"89" should read -- 29 --.
" 9" should read --  8 --.
" 1" should read --  9 --.
"30" should read -- 10 --.
"12" should read -- 32 --.
"31" should read -- 11 --.

UNITED STATES PATENT OFFICE
CERTIFICATE OF CORRECTION

Patent No. 3,809,571   Dated May 7, 1974   Page 2

Inventor(s) Norman R. Berlat

It is certified that error appears in the above-identified patent and that said Letters Patent are hereby corrected as shown below:

Table VI, column 1, "14" should read --34--.
"35" should read --15--.
"15" should read --35--.
"36" should read --16--.
"18" should read --38--.
" 7" should read --17--.
Column 7, claim 1, line 56, "reaction" should read --reactor--.

Signed and sealed this 4th day of March 1975.

(SEAL)
Attest:

RUTH C. MASON
Attesting Officer

C. MARSHALL DANN
Commissioner of Patents
and Trademarks